(12) United States Patent
Yazdanpanah (10) Patent No.: US 8,881,684 B1
(45) Date of Patent: Nov. 11, 2014

(54) ANIMAL WASHER BRUSH

(71) Applicant: Arash Yazdanpanah, Las Vegas, NV (US)

(72) Inventor: Arash Yazdanpanah, Las Vegas, NV (US)

(*) Notice: Subject to any disclaimer, the term of this patent is extended or adjusted under 35 U.S.C. 154(b) by 134 days.

(21) Appl. No.: 13/623,489

(22) Filed: Sep. 20, 2012

Related U.S. Application Data (60) Provisional application No. 61/537,681, filed on Sep. 22, 2011.

(51) Int. Cl.
*A01K 29/00* (2006.01)
*A46B 15/00* (2006.01)
*A47L 23/04* (2006.01)

(52) U.S. Cl.
USPC ........... 119/650; 119/601; 119/602; 119/600; 119/652; 119/654; 15/106; 15/110; 401/289; 401/9; 401/11

(58) Field of Classification Search
CPC . A01K 13/002; A01K 13/003; A01K 13/001; A45D 24/14; A45D 24/16; A46B 2200/1066; A46B 9/02; A46B 3/005
USPC ......... 119/601, 612, 615, 652, 650, 664, 616, 119/625, 600, 602, 603; 15/106, 110, 160, 15/187, 188, 104.94; D30/158; 401/289, 401/9–11; 132/148, 150
See application file for complete search history.

(56) References Cited

U.S. PATENT DOCUMENTS

| | | | | |
|---|---|---|---|---|
| 302,734 A * | 7/1884 | Jobson | | 132/142 |
| 416,330 A * | 12/1889 | Foster | | 15/160 |
| 489,694 A * | 1/1893 | Sims | | 15/160 |
| 1,004,646 A * | 10/1911 | Hawkes | | 15/160 |
| 1,548,452 A * | 8/1925 | Fyhrie | | 404/97 |
| 1,742,929 A * | 1/1930 | Ovtshenikoff | | 15/160 |
| 2,236,034 A * | 3/1941 | Luce et al. | | 15/167.1 |
| 2,511,235 A * | 6/1950 | Arwood | | 15/143.1 |
| 2,633,591 A * | 4/1953 | Servilla | | 15/160 |
| 2,799,283 A * | 7/1957 | Kapusnyk | | 132/120 |
| 3,372,418 A * | 3/1968 | Di Ilio | | 15/165 |
| 3,761,990 A * | 10/1973 | Lynn | | 15/160 |
| 5,072,479 A * | 12/1991 | Van Niekerk | | 15/111 |
| D428,706 S * | 8/2000 | Thunderchild | | D4/132 |
| D433,819 S * | 11/2000 | Thunderchild | | D4/132 |
| 7,021,850 B1 * | 4/2006 | Lee | | 401/291 |
| 7,841,038 B2 * | 11/2010 | Vosbikian | | 15/106 |
| 8,528,146 B1 * | 9/2013 | Abrahamson | | 15/160 |
| 2003/0075202 A1 * | 4/2003 | Silvers et al. | | 134/6 |
| 2004/0086322 A1 * | 5/2004 | DeLaine, Jr. | | 401/289 |
| 2006/0117510 A1 * | 6/2006 | Sellers | | 15/160 |
| 2007/0261643 A1 * | 11/2007 | Hurwitz | | 119/602 |
| 2011/0067717 A1 * | 3/2011 | McHugh | | 132/114 |
| 2011/0094047 A1 * | 4/2011 | Gold et al. | | 15/172 |
| 2011/0225755 A1 * | 9/2011 | Carlson et al. | | 15/145 |
| 2011/0232579 A1 * | 9/2011 | Clayson | | 119/622 |
| 2011/0247157 A1 * | 10/2011 | Caillou | | 15/147.1 |
| 2011/0308025 A1 * | 12/2011 | Vosbikian et al. | | 15/105 |

* cited by examiner

*Primary Examiner* — Andrea Valenti

(74) *Attorney, Agent, or Firm* — Thorpe North & Western LLP (57) ABSTRACT

An animal washing brush for washing an animal has a hand grip and a head disposed on a handle with an elongated shaft. The head has opposite or transverse surfaces facing in substantially opposite or transverse directions, including a substantially flat surface and a concave surface. Each of the flat and concave surfaces has a matrix of flexible and resilient fingers extending from the surface. The fingers have a height taller than a diameter, and a spacing on the same order of the diameter.

18 Claims, 8 Drawing Sheets

ANIMAL WASHER BRUSH

PRIORITY CLAIM

Priority is claimed to U.S. Provisional Patent Application Ser. No. 61/537,681, filed Sep. 22, 2011, which is hereby incorporated herein by reference in its entirety.

BACKGROUND

1. Field of the Invention

The present invention relates generally to a brush for washing, brushing and massaging animals.

2. Related Art

Washing or bathing animals, such as dogs, can be difficult and time consuming. In addition, such a task can be more difficult or impossible for people with back problems, injuries, the elderly and/or the handicapped.

SUMMARY OF THE INVENTION

It has been recognized that it would be advantageous to develop a method and brush to facilitate washing animals, such as larger animals, and by people with an injury or disability to reduce the strenuous nature of the task. In addition, it has been recognized that it would be advantageous do develop a brush to allow more control over the brush and the strength or pressure applied by the brush. In addition, it has been recognized that it would be advantageous do develop a brush to allow maneuverability of the brush. Furthermore, it has been recognized that it would be advantageous to develop a brush that makes the washing process easier, and gives the washer more control.

The invention provides an animal washing brush for washing an animal. The brush includes a handle with an elongated shaft. A hand grip is on one end of the handle. A head is disposed on an opposite end of the handle from the hand grip. The head has a surface. The surface has a matrix of flexible and resilient fingers extending from the surface. The fingers are self-supporting. The fingers have a height taller than a diameter, and a spacing on the same order of the diameter.

In accordance with a more detailed aspect of the invention, the brush can further include the head having opposite or transverse surfaces facing in substantially opposite or transverse directions. The opposite or transverse surfaces can include a substantially flat surface parallel with a substantially planar layer, and a concave surface facing in a substantially opposite or transverse direction from the flat surface, and having an arcuate shape about an axis of curvature. Each of the flat and concave surfaces can have a matrix of flexible and resilient fingers extending from the surface. The head can be rigid, and the concave and flat surfaces can be rigid. The concave surface and flat surface can be oriented perpendicular to one another. The fingers can have a frusto-conical shape with a greater diameter at a base thereof, and a reduced diameter at a tip thereof, and the tips can be rounded. The fingers can have equal length. A clip can be affixed to the head or the handle and sized and shaped to receive a water hose adjacent the head. The shaft of the handle can further include at least two telescoping tubes. The shaft of the handle can be hollow, and the handle can further include a hose coupling on the end of the handle with the hand grip, and an outlet opening in the surface. The washing brush can be in combination with a kit having at least two brush devices with different sizes, and instruction to scrub the animal with the brushes. The surface can be flexible and resilient. The concave surface and the flat surface can be opposite one another on the head and face in opposite directions. The washing brush can have a swivel connection between the head and the handle. The handle can be oriented with respect to the head or surfaces in multiple orientations, including: a skewed orientation and a parallel orientation. In the skewed orientation, the handle can be oriented transverse to the axis of curvature of the concave surface and/or transverse to the planer layer of the flat surface. In the parallel orientation, the handle can be oriented substantially parallel with the axis of curvature of the concave surface and substantially parallel with the planer layer of the flat surface.

In addition, the invention provides an animal washing brush for washing an animal. The washing brush includes a handle with an elongated shaft. A hand grip is on one end of the handle. A head is disposed on an opposite end of the handle from the hand grip. A substantially flat surface is disposed on the head parallel with a substantially planar layer. A concave surface is disposed on the head with an arcuate shape about an axis of curvature. The flat and concave surfaces are oriented transverse with respect to one another and face transverse directions. The concave surface intersects the flat surface forming an arcuate concave indentation in a lateral side of the flat surface. Each of the flat and concave surfaces have a matrix of flexible and resilient fingers extending from the surface. The fingers are self-supporting. The fingers have a height taller than a diameter, and a spacing on the same order of the diameter. The fingers have a frusto-conical shape with a greater diameter at a base thereof, and a reduced diameter at a tip thereof, and a tip that is rounded. The brush can have a hose coupling on the end of the handle with the hand grip, and an outlet opening in at least one of the surfaces.

In accordance with a more detailed aspect of the invention, the head can include lateral flanges transverse to both the flat and concave surfaces.

Furthermore, the invention provides a method for washing an animal, including: holding a hand grip of a handle having a head on an opposite end from the hand grip; scrubbing a body portion of the animal with a concave surface of the head having an arcuate shape about an axis of curvature and a matrix of flexible and resilient fingers extending from the concave surface; turning the handle and thus the head; and scrubbing an appendage portion of the animal with a substantially flat surface of the head and parallel with a substantially planar layer and facing in substantially opposite or transverse direction from the concave surface and having a matrix of flexible and resilient fingers extending from the flat surface.

In accordance with a more detailed aspect of the invention, the fingers can have a height taller than a diameter, and a spacing on the same order of the diameter. The method can include clipping a water hose to the head or handle with a clip affixed to the head or the handle and sized and shaped to receive a water hose adjacent the head. The method can include extending or retracting the head with respect to the handle wherein the shaft of the handle further includes at least two telescoping tubes. The method can include selecting one of at least two brush devices having different sizes from a kit. The head can be rigid and the concave and flat surfaces can be rigid. At least one of the concave and flat surfaces can be flexible and resilient. The method can include swiveling the head with respect to the handle with: a swivel connection between the head and the handle; and the handle being oriented with respect to the head or surfaces in multiple orientations, including: a skewed orientation with the handle oriented transverse to the axis of curvature of the concave surface and/or transverse to the planer layer of the flat surface; and a parallel orientation with the handle oriented substantially parallel with the axis of curvature of the concave surface and substantially parallel with the planer layer of the flat surface.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 19a is a partial perspective view of another animal washing brush in accordance with another embodiment of the present invention;

FIG. 19b is a partial side view of the animal washing brush of FIG. 19a;

FIG. 19c is a partial front view of the animal washing brush of FIG. 19a;

FIG. 20a is a partial perspective view of another animal washing brush in accordance with another embodiment of the present invention;

FIG. 20b is a partial side view of the animal washing brush of FIG. 20a; and

FIG. 20c is a partial front view of the animal washing brush of FIG. 20a.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in the FIGS. 1-15, an animal washing brush, indicated generally at 10, in an example implementation in accordance with the invention is shown for washing animals. Animal washing is one example of a field that can benefit from the brush of the present invention. The brush of the present invention can makes the washing process easier, and gives the washer more control. In addition, the brush can reduce the time of the washing process. Furthermore, the brush of the present invention can accomplish at least three functions, including use as a washing brush for washing animals, use as a shedding tool for brushing animals, and as a massager for massaging animals.

The brush 10 has a handle 14 including an elongated shaft 18. The shaft can be a pole or rod made of wood, plastic, aluminum or the like. The shaft can also be hollow. The shaft 18 of the handle 14 can included two or more telescoping tubes that allow the length of the handle to be lengthened or shortened. The shaft 18 of the handle 14 can be adjusted to be longer to avoid or eliminate awkward and uncomfortable bending, and thus reduce injury. Thus, an animal can be washed from a standing or upright position of the user or washer. The adjustable handle can also make it easier to reach hard to reach places. A hand grip 22 is disposed on one end, such as the proximal end, of the handle 14 or shaft, and a head 26 is disposed on an opposite end, such as a distal end, of the handle or shaft from the hand grip. The hand grip can be formed of a high friction material such as plastic, rubber or rubber-like material, and shaped to fit comfortably in a user's hand.

Figure 18:
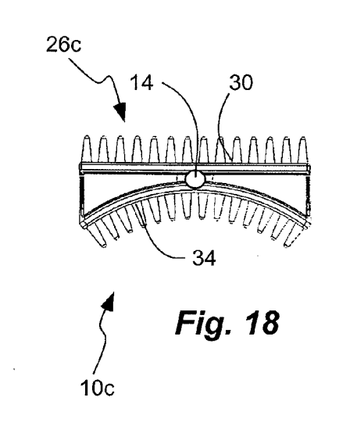
FIG. 18 is an end view of an animal washing brush in accordance with an embodiment of the present invention.

The head 26 can have opposite or transverse surfaces or plates facing in substantially opposite or transverse directions, including: a substantially flat surface or plate 30 and a concave surface or plate 34. The substantially flat surface 30 can be parallel with a substantially planar layer or plane. The flat surface can be used against broad surfaces or parts of the animal. The concave surface 34 can face in a substantially opposite or transverse direction from the flat surface. The concave surface 34 can have an arcuate shape, such as a partially cylindrical shape, about an axis of curvature 38. The concave surface can be used against curved surfaces or parts of the animal. In one aspect, the surfaces 30 and 34 can be oriented perpendicular to one another, or can face in directions perpendicular to one another, as shown. The concave surface 34 can intersect the flat surface 30 forming an arcuate concave indentation 35 (FIG. 10) in a lateral side of the flat surface. The surfaces 30 and 34 can have a common lateral edge that is arcuate and at which the surfaces join together at an arcuate interface. The two surfaces can be provided adjacent one another and facing perpendicular one another for efficiency in washing or brushing. In another aspect, the surfaces can be oriented opposite one another, or can face in opposite directions, as shown in FIG. 18. In one aspect, the head 26 and/or the surfaces 30 and 34 can be rigid. The head can be formed of plastic or the like. A rigid head and surface can provide support to the fingers, described below. In another aspect, the head and/or the surfaces can be flexible and resilient. The head can be formed of rubber or the like. A flexible head and surface can conform to the animal's body or limbs. Although the surfaces 30 and 34 are shown having the same width, the flat surface 30 can be narrower than the curved surface 34. In one aspect, the head 26 can be substantially hollow or open between the surfaces 30 and 34, as shown, to reduce weight. In another aspect, the head can be solid or filled between the surfaces to reduce accumulation of debris. The head can include lateral flanges 36 on the lateral sides of the surfaces 30 and 34. The flanges 36 can extend back away from the surfaces and can be oriented transverse to both surfaces. In addition, the flanges on each surface can be oriented transverse to one another to form an angle or an L-shaped angle. The flange can provide strength to the head and rigidity to the surfaces while reducing weight.

The head 26 can have a rigid connection between the handle 14 and the head 26. The handle 14 or distal end thereof can attach to the head 26 between the surfaces 30 and 34. A boss can extend from the back of both surfaces at the interface between the two surfaces or back thereof. A threaded aperture can be formed in the boss to receive a threaded tip or nipple of the handle. Thus, the head can be removably coupled to the handle. Flanges can be formed between the boss and the back of the surfaces. The aperture can extend through the boss to one of the surfaces to create a flow path through the handle, the connection to the head, and the head, to the surface.

Each of the opposite surfaces 30 and 34 can have a matrix or array of flexible and resilient fingers 42 extending from the surface. The fingers of the flat surface can be disposed in a substantially planer layer, while the fingers of the concave surface can be disposed in a substantially arcuate shape, such as a partially cylindrical layer. The fingers can be arranged in perpendicular rows and columns. The fingers can be flexible and resilient so that they can bend or flex under an applied force, but can return to their original shape and orientation upon removal of the applied force. Thus, the fingers can be self-supporting and can maintain their shape and orientation. The fingers can be formed of an elastic material, such as rubber or rubber-like materials. Thus, the fingers can both provide a massage effect and remove dead, unwanted hair. The hair can be removed by the fingers, and easily removed by the user from the fingers. The brush can be used dry to remove hair to reduce allergies and reduce shedding. Adjusting the handle can make brushing more comfortable for the user or brusher. The fingers of the brush can also be used wet while washing to remove hair. The fingers can have a circular cross-sectional shape (although other shapes can be used). The fingers can have a frusto-conical, or truncated cone, shape. The fingers can have a height (extending from the surface) longer than a diameter or width thereof, and a spacing on the same order as the diameter or width. The fingers can have a diameter, a height taller than the diameter, and a spacing on the same order of the diameter. The fingers can have a diameter between approximately 0.2 to 0.5 inches, a height between approximately 0.2 to 2 inches, and spacing between approximately 0.2 to 1 inches. The fingers can have a rounded, semi-spherical tip. The fingers on a surface can have equal lengths or heights. In one aspect, the fingers on both surfaces can have equal lengths to one another. In another aspect, the fingers on the flat surface can be shorter in length, and the fingers on the concave surface can be longer in length. The fingers on the flat surface can extend perpendicularly to the flat surface. The fingers on the concave surface can extend perpendicularly to the arcuate surface from where they extend, and in a generally inward direction towards the axis of curvature 38. The shape and size of the fingers can provide sufficient rigidity and flexibility to provide for washing, brushing and massage. The fingers can both agitate the fur of the animal during cleaning, and massage the animal's skin. The concave surface and fingers can be used on the animal's torso and/or other curved surfaces of the animal, such as the back and/or underbelly. The flat surface and fingers can be used on appendages and/or other surfaces of the animal, such as legs and sides of torso.

In one aspect, the fingers can be formed on sheets 44 (FIGS. 11-15) or in layers that can be attached to the head or surfaces thereof, such as with adhesive. The sheets and the head together can form the flat and concave surfaces 30 and 34. The fingers can be formed on flat sheets, and then attached to the surfaces, with the concave surface imparting the curvature thereof to the sheet attached thereto. The sheets or layers can also have a cavity with a perimeter flange opposite the fingers that can fit over a perimeter of the head or surfaces thereof. Thus, the sheets or layers can be removably attached to the head or surfaces thereof. In another aspect, the fingers can be formed integrally and at the same time and with the same materials as the surface or the head. In another aspect, the fingers and head can be integrally formed at the same time and with the same materials as a single monolithic body. In another aspect, the fingers and/or layers can be injection molded over the head.

In one aspect, the handle 14 and/or shaft 18 can include a hose coupling 43 on the end of the handle with the hand grip 22 and disposed adjacent or proximal to the hand grip. The hose coupling can be a female type hose coupling to receive a male hose coupling that is attached to a water source, such as a spigot. In addition, an outlet opening 44 can be formed in at least one of the surfaces, such as in the concave surface 34, as shown. The opening can be formed in the flat surface, or both the flat surface and the concave surface. The shaft 18 of the handle can be hollow so that water can flow through the handle to the head.

Figures 1, 2:
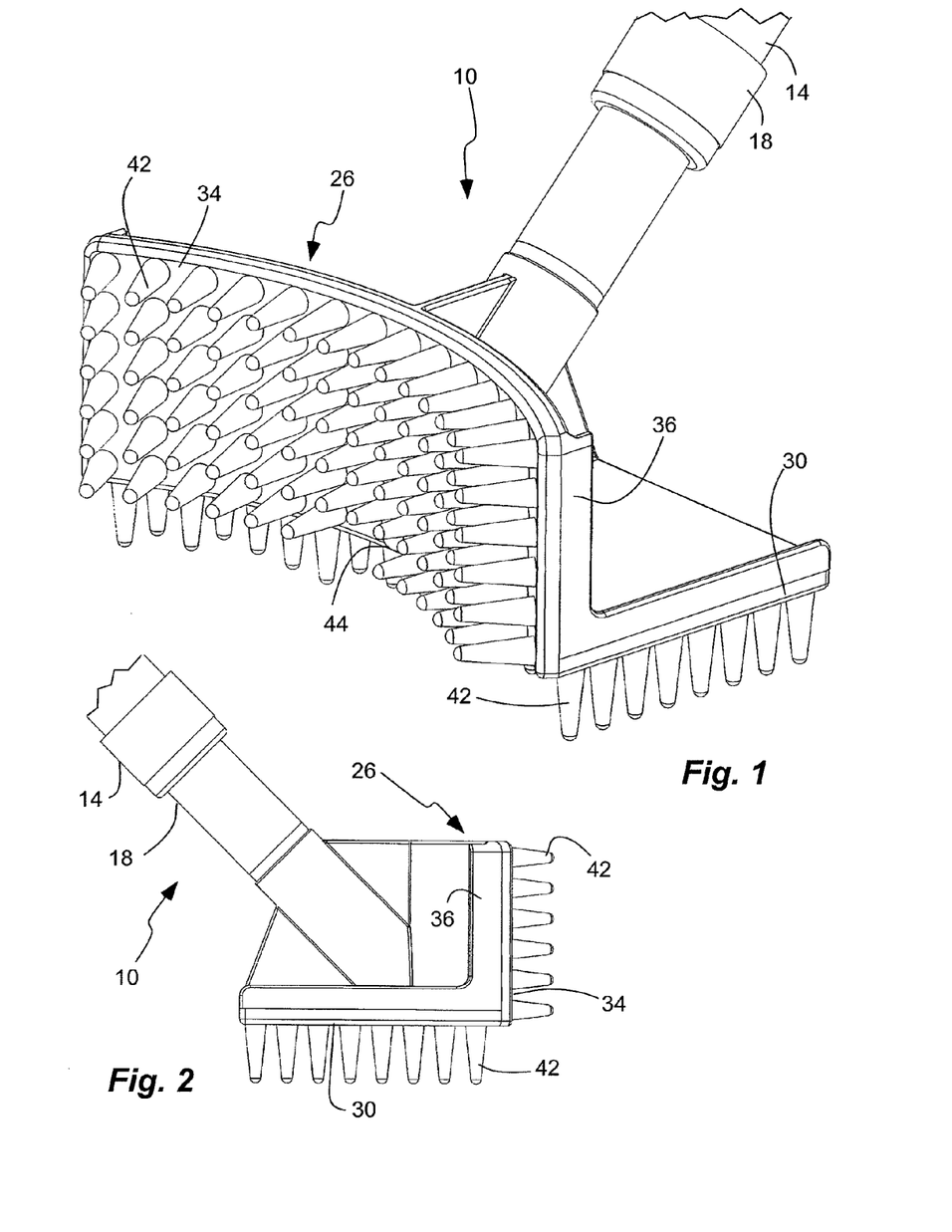
FIG. 1 is a partial front perspective view of an animal washing brush in accordance with an embodiment of the present invention.
FIG. 2 is a partial side view of the animal washing brush of FIG. 1.
Figures 3, 4, 5:
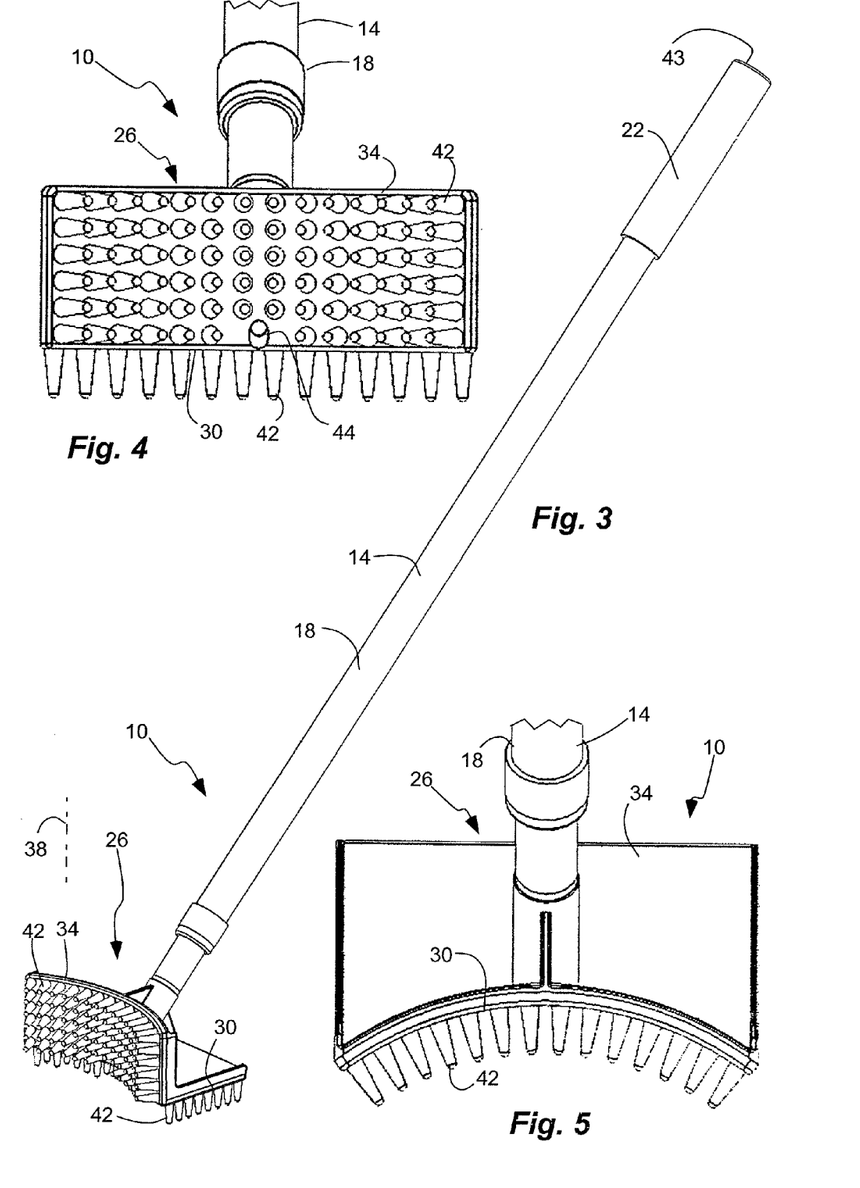
FIG. 3 is a front perspective view of the animal washing brush of FIG. 1.
FIG. 4 is a partial bottom view of the animal washing brush of FIG. 1.
FIG. 5 is a partial top view of the animal washing brush of FIG. 1.
Figures 6, 7, 8, 9, 10:
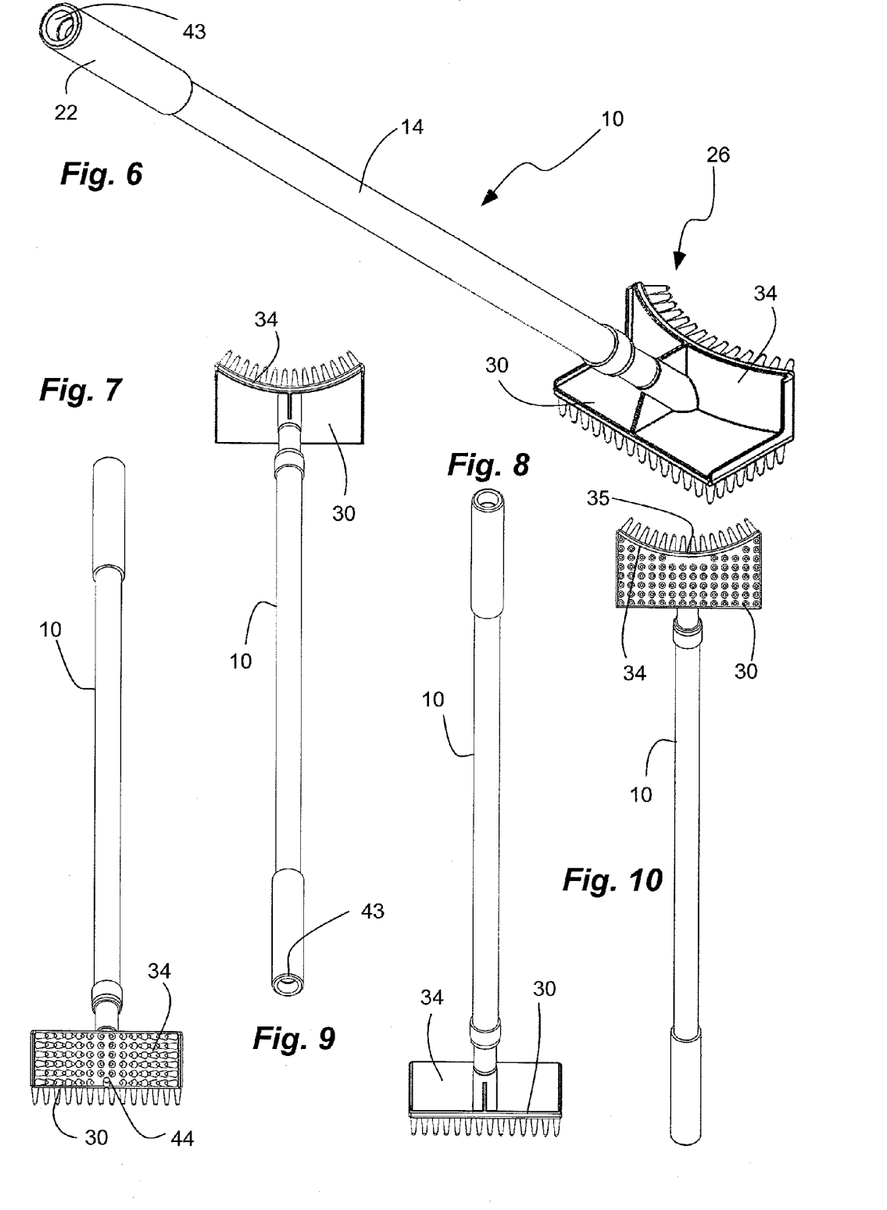
FIG. 6 is a rear perspective view of the animal washing brush of FIG. 1.
FIG. 7 is a bottom view of the animal washing brush of FIG. 1.
FIG. 8 is a rear view of the animal washing brush of FIG. 1.
FIG. 9 is a top view of the animal washing brush of FIG. 1.
FIG. 10 is a front view of the animal washing brush of FIG. 1.
Figure 11:
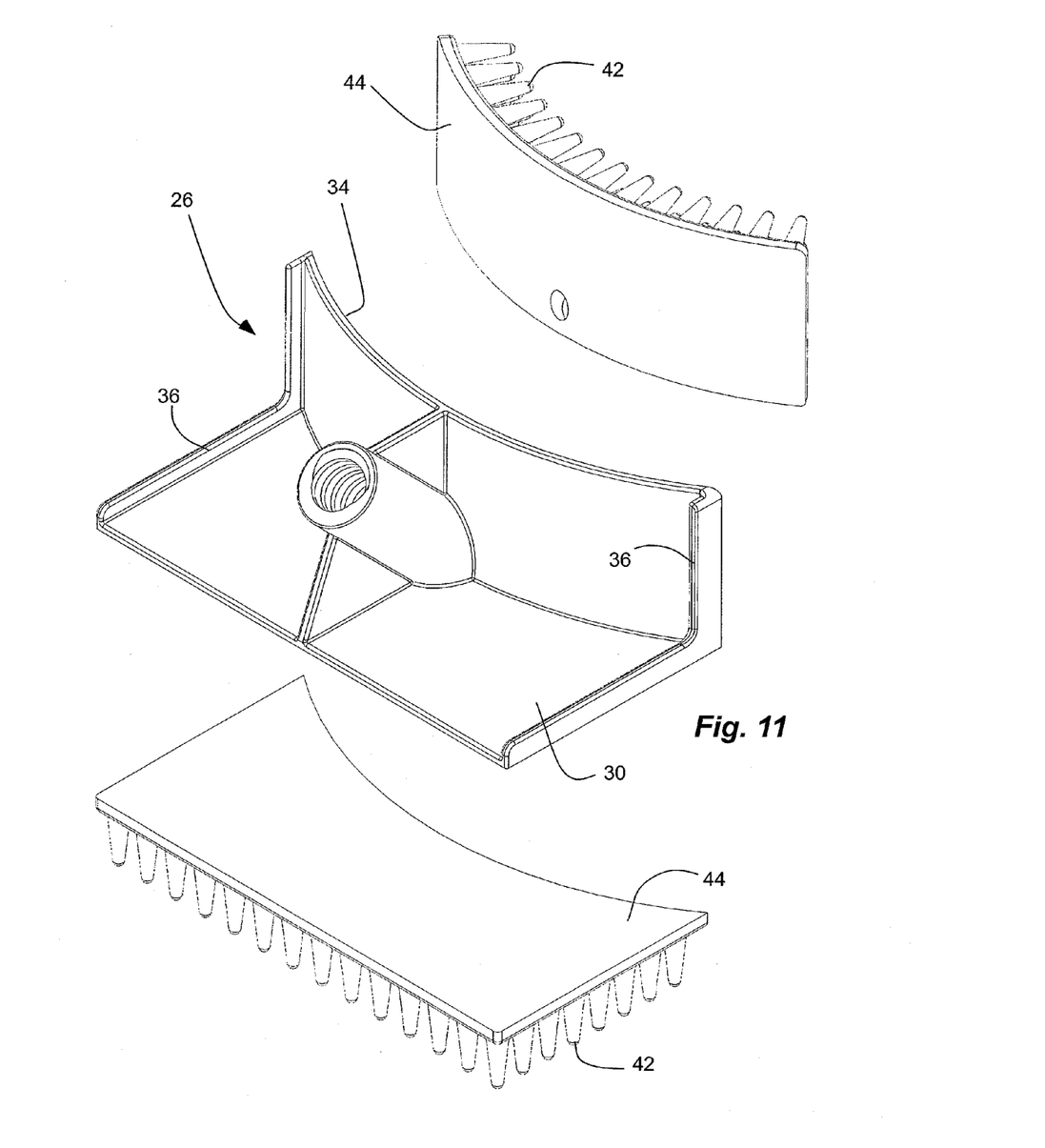
FIG. 11 is an exploded view of a head of the animal washing brush of FIG. 1.
Figure 12:
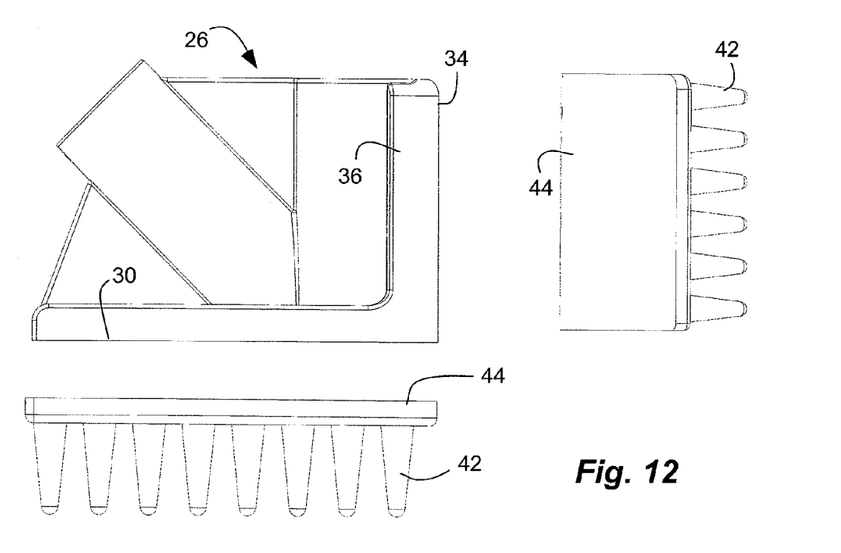
FIG. 12 is an exploded view of the head of the animal washing brush of FIG. 1.
Figure 13:
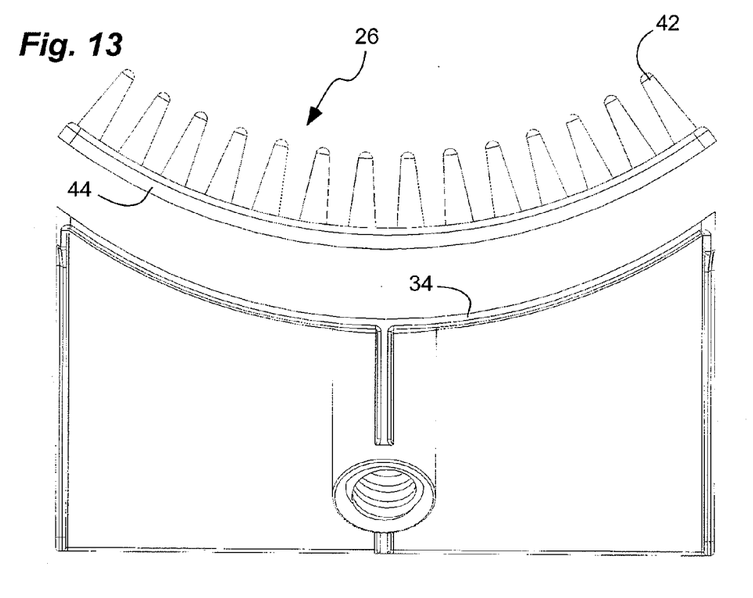
FIG. 13 is an exploded top view of the animal washing brush of FIG. 1.
Figure 14:
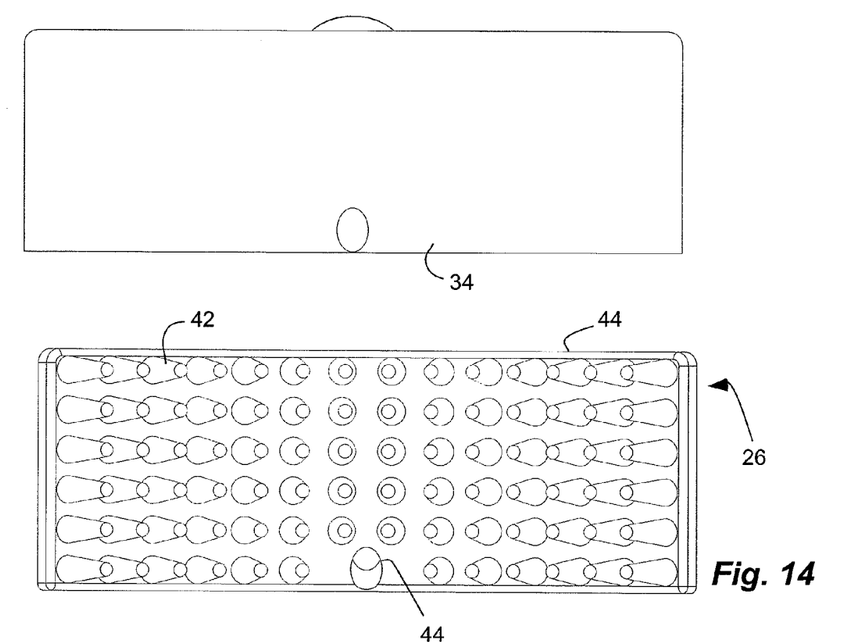
FIG. 14 is an exploded front view of the head of the animal washing brush of FIG. 1.
Figure 15:
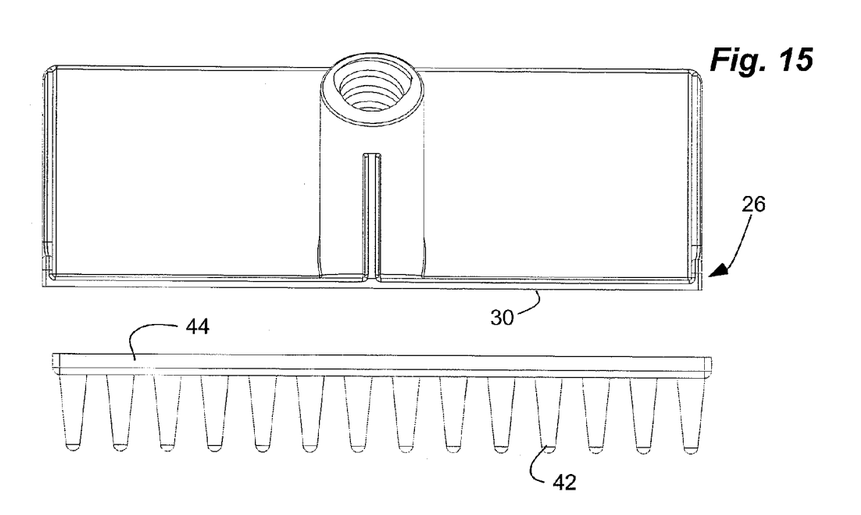
FIG. 15 is an exploded rear view of the head of the animal washing brush of FIG. 1.
Figure 16:
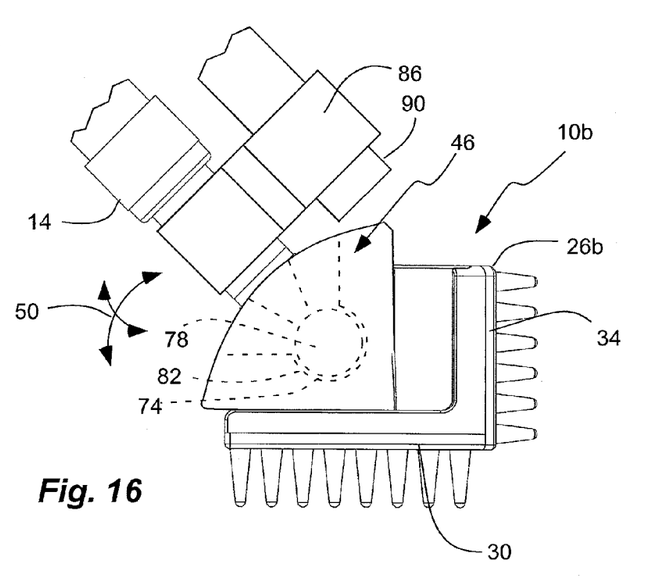
FIG. 16 is a view of an animal washing brush with a swivel connection in accordance with an embodiment of the present invention.

Referring to FIG. 16, another brush 10b is shown that is similar in many respects to that described above, and which description is herein incorporated by reference, but which has a swivel connection 46 between the head 26b and the handle 14. The swivel connection 46 allows the head 26b, or the surfaces 30 and 34, to pivot or swivel, indicated at 50, with respect to the handle during use to facilitate alignment of the head or surfaces with the animal. Thus, the handle 14 can be oriented with respect to the handle in multiple orientations, including: a skewed orientation and a parallel orientation. In the skewed orientation, the handle 14 can be oriented transverse to the axis of curvature 38 of the concave surface 34 and/or transverse to the planer layer of the flat surface 30. In the parallel orientation, the handle 14 can be oriented substantially parallel with the axis of curvature 38 of the concave surface 34 and/or substantially parallel with the planer layer of the flat surface 30. Thus, the handle and/or head can swivel side-to-side, and up-and-down, or both.

In one aspect, the swivel connection 46 can include a ball-and-socket type joint. A cavity 74 can be formed in the head 26b. An enlarged knob 78 can be formed on the end of the handle 14 and received within the cavity. The cavity and knob can be substantially spherical. An inlet 82 to the cavity can be shaped to receive the handle and limit the degree or angle of the swivel or pivot.

In another aspect, the brush can have a swivel connection that can include a pivot axel formed on the head, such as between the surfaces, and received in a bore of the handle. The handle can pivot side-to-side, transverse to the axis of curvature but within the planer layer about the axel. In addition, the fit between the pivot axel and the bore can be loose to allow the handle to pivot up-and-down, perpendicular to the side-to-side direction, transverse to the axis of curvature and the planer layer. Stops can be provided adjacent the swivel connection to limit the degree or angle of swivel or pivot. In another aspect, the head 26c can be formed by two head portions, a flat portion and a concave portion providing the flat and concave surfaces, respectively, and the swivel connection therebetween.

In one aspect, a clip 86 can be affixed to the head or the handle 14 and sized and shaped to receive a water hose 90 adjacent the head, as shown in FIG. 16. The clip can have a figure-8 shape with opposing C-shapes to receive the handle or shaft and the hose. Thus, the end of a water hose can be positioned to spray on the head, surfaces, and/or animal while washing.

Figure 17:
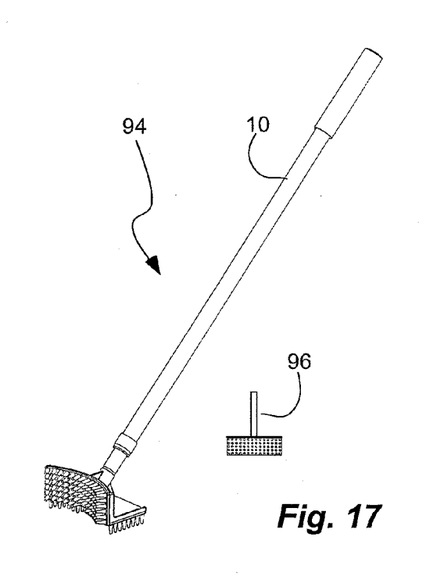
FIG. 17 is a schematic view of an animal washing brush in accordance with an embodiment of the present invention.

In another aspect, a kit 94 can be provided with brushes (two or more) as described above, but in different sizes, as shown in FIG. 17. A smaller more delicate brush 96 can be included for facial hair, etc. The kit can include instructions to scrub the animal with the brushes.

As described above, the head and/or surfaces described above can be rigid. Alternatively, the head and/or one or more of the concave or flat surfaces can be flexible and resilient.

Referring to FIG. 18, another brush 10c is shown that is similar in many respects to that described above, and which description is herein incorporated by reference, but which has the flat and concave surfaces 30 and 34 of the head 26c facing in opposite directions.

Figures 19A, 19B, 19C:
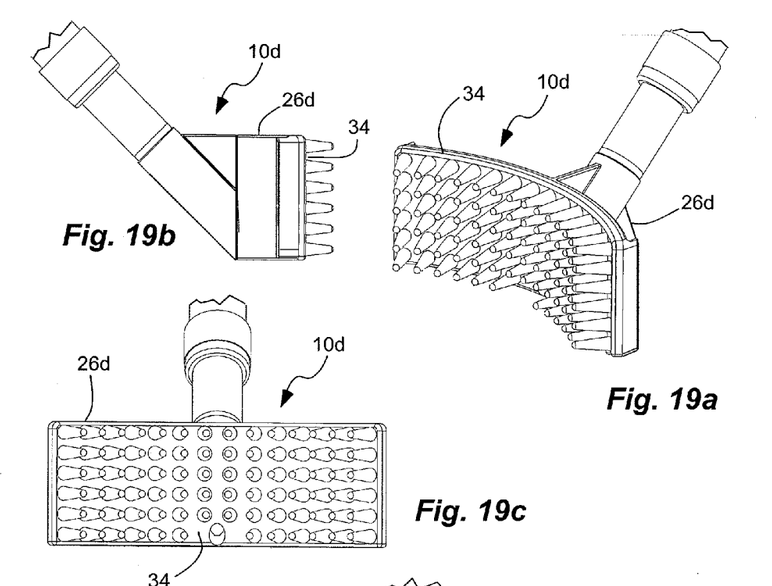

Referring to FIGS. 19a-c, another brush 10d is shown that is similar in many respects to those described above, and which description is herein incorporated by reference, but which has a single surface 34 on the head 26d that is concave.

Figures 20A, 20B, 20C:
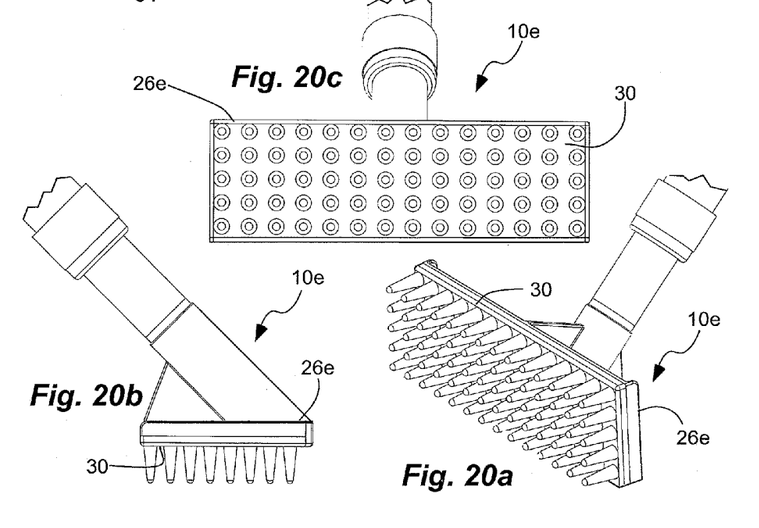

Referring to FIGS. 20a-c, another brush 10e is shown that is similar in many respects to those described above, and which description is herein incorporated by reference, but which has a single surface 30 on the head 26e that is flat.

A method for using the brushes described above and/or for washing an animal, includes:
 a) holding a hand grip of a handle having a head on an opposite end from the hand grip;
 b) scrubbing a body portion of the animal with a concave surface of the head having a arcuate shape about an axis of curvature and a matrix of flexible and resilient fingers extending from the concave surface;
 c) turning the handle and thus the head; and
 d) scrubbing an appendage portion of the animal with a substantially flat surface of the head and parallel with a substantially planar layer and facing in substantially opposite or transverse direction from the concave surface and having a matrix of flexible and resilient fingers extending from the flat surface.

The head can be swiveled with respect to the handle with a swivel connection between the head and the handle, the handle being oriented with respect to the handle in multiple orientations, including:
 1) a skewed orientation with the handle oriented transverse to the axis of curvature of the concave surface and/or transverse to the planer layer of the flat surface; and
 2) a parallel orientation with the handle oriented substantially parallel with the axis of curvature of the concave surface and substantially parallel with the planer layer of the flat surface.

A water hose can be clipped to the head or handle with a clip affixed to the head or the handle and sized and shaped to receive a water hose adjacent the head. The head can be extended or retracted with respect to the handle wherein the shaft of the handle further includes at least two telescoping tubes. One of at least two brush devices can be selected having different sizes from a kit.

In accordance with another aspect of the invention, the brush and/or the head can be provided with a single surface having the fingers. Thus, two brushes can be provided, one having fingers on a concave surface, and another having fingers on a flat surface.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An animal washing brush device configured for washing an animal, the device comprising:
 a) a handle including an elongated shaft;
 b) a hand grip on one end of the handle;
 c) a head disposed on an opposite end of the handle from the hand grip and having opposite or transverse surfaces facing in substantially opposite or transverse directions, including:
 d) a substantially flat surface parallel with a substantially planar layer;
 e) a concave surface having an arcuate shape about an axis of curvature and facing in a substantially opposite direction from the flat surface or in a transverse direction from the flat surface wherein the concave surface intersects the flat surface forming a concave indentation in a lateral side of the flat surface;
 f) each of the surfaces having a matrix of flexible and resilient fingers extending from the surface;
 g) the fingers being self-supporting; and
 h) the fingers having a height taller than a diameter, and a spacing on the same order of the diameter.

2. A device in accordance with claim 1, wherein the head is rigid and wherein the concave and flat surfaces are rigid.

3. A device in accordance with claim 1, wherein the concave surface and flat surface are oriented perpendicular to one another.

4. A device in accordance with claim 1, wherein the fingers have a frusto-conical shape with a greater diameter at a base thereof, and a reduced diameter at a tip thereof; and wherein the tip is rounded.

5. A device in accordance with claim 1, wherein the fingers have equal length.

6. A device in accordance with claim 1, further comprising: a clip affixed to the head or the handle and sized and shaped to receive a water hose adjacent the head.

7. A device in accordance with claim 1, wherein the shaft of the handle further includes at least two telescoping tubes.

8. A device in accordance with claim 1, wherein the shaft of the handle is hollow, and wherein the handle further includes a hose coupling on the end of the handle with the hand grip, and an outlet opening in the surface.

9. A device in accordance with claim 1, in combination with a kit having at least two brush devices having different sizes, and instructions to scrub the animal with the brushes.

10. A device in accordance with claim 1, wherein the surface is flexible and resilient.

11. A device in accordance with claim 1, wherein the concave surface and the flat surface are opposite one another on the head and face in opposite directions.

12. A device in accordance with claim 1, further comprising:
 a) a swivel connection between the head and the handle; and
 b) the handle being oriented with respect to the head or surfaces in multiple orientations, including:
 c) a skewed orientation with the handle oriented transverse to the axis of curvature of the concave surface and/or transverse to the planer layer of the flat surface; and d) a parallel orientation with the handle oriented substantially parallel with the axis of curvature of the concave surface and substantially parallel with the planer layer of the flat surface.

13. An animal washing brush device configured for washing an animal, the device comprising:
a) a handle including an elongated shaft;
b) a hand grip on one end of the handle;
c) a head disposed on an opposite end of the handle from the hand grip;
d) a substantially flat surface disposed on the head parallel with a substantially planar layer;
e) a concave surface disposed on the head with an arcuate shape about an axis of curvature;
f) the flat and concave surfaces being oriented transverse with respect to one another and facing transverse directions;
g) the concave surface intersecting the flat surface forming an arcuate concave indentation in a lateral side of the flat surface;
h) each of the flat and concave surfaces having a matrix of flexible and resilient fingers extending from the surface;
i) the fingers being self-supporting;
j) the fingers having a height taller than a diameter, and a spacing on the same order of the diameter;
k) the fingers have a frusto-conical shape with a greater diameter at a base thereof, and a reduced diameter at a tip thereof, and the tip being rounded;
l) a hose coupling on the end of the handle with the hand grip; and
m) an outlet opening in at least one of the surfaces.

14. A device in accordance with claim 13, wherein the head comprises lateral flanges transverse to both the flat and concave surfaces.

15. A method for washing an animal, comprising:
a) holding a hand grip of a handle having a head on an opposite end from the hand grip;
b) scrubbing a body portion of the animal with a concave surface of the head having an arcuate shape about an axis of curvature and a matrix of flexible and resilient fingers extending from the concave surface, wherein the fingers are self-supporting and have a height taller than a diameter, and a spacing on the same order of the diameter;
c) turning the handle and thus the head; and
d) scrubbing an appendage portion of the animal with a substantially flat surface of the head and parallel with a substantially planar layer and facing in substantially opposite or transverse direction from the concave surface and having a matrix of flexible and resilient fingers extending from the flat surface, wherein the fingers are self-supporting and have a height taller than a diameter, and a spacing on the same order of the diameter, and wherein the concave surface intersects the flat surface forming a concave indentation in a lateral side of the flat surface.

16. A method in accordance with claim 15, further comprising clipping a water hose to the head or handle with:
a clip affixed to the head or the handle and sized and shaped to receive a water hose adjacent the head.

17. A method in accordance with claim 15, further comprising extending or retracting the head with respect to the handle wherein the shaft of the handle further includes at least two telescoping tubes.

18. A method in accordance with claim 15, further comprising selecting one of at least two brush devices having different sizes from a kit.

* * * * *